United States Patent [19]

Mein et al.

[11] 4,304,760

[45] Dec. 8, 1981

[54] METHOD OF REMOVING POTASSIUM HYDROXIDE FROM CRYSTALLIZED POTASSIUM FERRATE (VI)

[75] Inventors: Peter G. Mein; Arno H. Reidies, both of LaSalle, Ill.

[73] Assignee: Carus Chemical Company, Inc., LaSalle, Ill.

[21] Appl. No.: 194,058

[22] Filed: Oct. 6, 1980

[51] Int. Cl.$^3$ .................... C01D 13/00; C01G 49/00
[52] U.S. Cl. ................................ 423/150; 423/179; 423/202; 423/275; 423/594
[58] Field of Search ............. 423/594, 150, 179, 202, 423/275

[56] References Cited

U.S. PATENT DOCUMENTS 2,758,090  8/1956  Mills et al. .................... 423/275
2,835,553  5/1958  Harrison et al. ................ 423/594

OTHER PUBLICATIONS

Schreyer et al., "Inorganic Synthesis, vol. 4", McGraw-Hill Co., N.Y., 1953, pp. 164–168.

*Primary Examiner*—Herbert T. Carter

[57] ABSTRACT

Potassium ferrate (VI), $K_2FeO_4$, which has been crystallized from a concentrated aqueous solution of KOH is washed with an aqueous solution of a potassium salt of an inorganic acid to remove the residual KOH. The wash solution is at an alkaline pH and contains a high concentration of the potassium salt.

12 Claims, No Drawings

METHOD OF REMOVING POTASSIUM HYDROXIDE FROM CRYSTALLIZED POTASSIUM FERRATE (VI)

BACKGROUND AND PRIOR ART

This invention relates to the preparation of potassium ferrate (VI), $K_2FeO_4$, by a process in which the $K_2FeO_4$ is crystallized from concentrated aqueous potassium hydroxide (KOH) solution, separated therefrom, and washed to remove the residual KOH solution from the separated KOH crystals.

In the preparation of potassium ferrate (VI), $K_2FeO_4$, the product is recovered by crystallization from a concentrated potassium hydroxide solution, for example, from a near saturated (viz. 50%) aqueous KOH solution. This very concentrated KOH solution clings very stubbornly to the $K_2FeO_4$ crystals and cannot be completely removed by either filtration or centrifugation. Typically, the raw $K_2FeO_4$ product still contains 20 to 30% adherent KOH. This alkali hydroxide content is undesirable because it interferes with the drying of the material and also causes problems in such uses of $K_2FeO_4$ where an excess of alkali is harmful.

The recommended laboratory method of KOH removal involves washing of the raw $K_2FeO_4$ with a succession of several different organic solvents: benzene, followed by a lower aliphatic alcohol (viz. methanol, ethanol, isopropanol), and finally by diethyl ether. This standard approach is described in Jones, *Inorganic Synthesis*, Vol. 4, pp. 164–168, (McGraw Hill, 1953). In the customary washing, sequence of benzene-alcohol-ether, the benzene is used to eliminate the water present in the strong KOH solution because the presence of water is believed to enhance an undesirable oxidative reaction between ferrate VI and alcohol. The alcohol used in the next step is the means to remove the adherent KOH. Alcohol dissolves the potassium hydroxide but leaves the $K_2FeO_4$ on the filter. The ether used in the final step serves the purpose of removing the remaining alcohol (present from the preceding step), and also gives a practically dry finished product because the ether can be evaporated at room temperature in a desiccator.

Although potassium ferrate (VI) is one of the best oxidizing agents known, and potentially has many desirable applications as an oxidizing agent, it is not as yet been produced or used commercially on a large scale. One of the unsolved problems connected with the commercial production of $K_2FeO_4$ is a need for a better procedure to remove KOH from the crystallized $K_2FeO_4$. The use of a sequence of washes with organic solvents is undesirable for commercial practice. Such solvents are inherently flamable and may provide toxicity problems. Further, the process can be hazardous in that the ferrate may oxidize the organic solvent, and such oxidation may be so rapid as to result in an explosion. For example, alcohols such as methanol or ethanol are subject to ferrate oxidation, especially in the presence of water. Therefore, if the water is incompletely removed from the crystallized ferrate by the preliminary benzene wash, a potential process hazard may exist. Further, although the potassium hydroxide is selectedly soluble in the alcohol, it is not sufficiently volatile at a low temperature to permit drying of the ferrate without decomposition. Therefore, it is apparently necessary to use a further wash with a more volatile solvent, such as diethyl ether, to remove the alcohol, so that the residual organic solvent can be removed in low temperature drying of the ferrate product. If residual organic solvent or other organic matter is accidently allowed to stay with the ferrate during and after drying, violent explosions can occur.

SUMMARY OF INVENTION

This invention is based in part on the discovery that under selected conditions residual potassium hydroxide solution can be selectively removed from crystallized potassium ferrate (VI) by washing the separated $K_2FeO_4$ crystals with an aqueous solution of a potassium salt and an inorganic acid. Potassium ferrate VI is highly soluble in water and decomposes in aqueous solution. However, by using the potassium salt at a high concentration, the effect of the common potassium ion ($K^+$) suppresses the solubilization of the $K_2FeO_4$. Further, however, such high concentrations of the potassium salt would be expected to contaminate the product with the potassium salt. But potassium salts of the kind used in the method of the present invention can be incorporated with the ferrate product and need not be removed therefrom. Where the potassium salt is a phosphate salt, as preferred, the stability of the ferrate may be promoted in the solid phase as well as in aqueous solution. U.S. Pat. No. 2,758,090 proposes the solution stabilization of ferrates by having certain phosphate salts present in the solution.

DETAILED DESCRIPTION

The potassium ferrate (VI) to be used in the improved method of the present invention can be prepared by any known process, such as the processes described in Jones, *Inorganic Synthesis*, Vol. 4, pp 164–168 (McGraw Hill, 1953); and U.S. Pat. No. 2,758,090. In the application of the present invention, however, it is essential that the potassium ferrate (VI) be purified and recovered by crystallization from a concentrated aqueous solution of potassium hydroxide (KOH). For example, 40 to 50% acqueous KOH solution can be used. The starting material for the improved method of the present invention comprises the crystallized $K_2FeO_4$ after separation from the potassium hydroxide solution. It will contain residual amounts of KOH solution which must be removed. For example, the crystallized $K_2FeO_4$ may contain some 25 to 43 parts by weight of 40 to 50% KOH to each 100 parts of $K_2FeO_4$.

In accordance with the present invention, the $K_2FeO_4$ crystals having the KOH solution adsorbed on the surfaces of the crystals is washed with an aqueous solution of a potassium salt of an inorganic acid to remove the residual KOH solution. The concentration of the potassium salt in the wash solution is important as well as the pH of the solution. In general, the wash solution should have a concentration of the potassium salt of at least 30% by weight, and the wash solution should have a pH of greater than 9.0. The high concentration of potassium salt provides a high concentration of potassium ion which inhibits solubilization of the potassium ferrate, and the alkaline pH promotes the stability of the ferrate.

In general, potassium salts of inorganic acids which are classified as acids of weak or moderate strength can be employed, providing they otherwise meet the required conditions. In addition to being soluble to the extent required to provide the desired concentration and providing the desired alkaline pH, the salt should be stable in aqueous solution in contact with the potassium ferrate. It can easily be determined whether any particular phosphate salt meets these conditions. Potassium salts which have found particularly desirable are: potassium phosphate ($K_3PO_4$), potassium carbonate ($K_2CO_3$), potassium floride (KF), potassium pyrophosphate ($K_4P_2O_7$), and potassium orthophosphate ($K_2HPO_4$). The phosphate salts are particularly desirable, since it is believed that the phosphate salts promote the stability of the potassium ferrate both in solid phase and in solution. For example, phosphate salts or phosphate ions may complex with $Fe^{III}$, $Co^{II}$, $Ni^{II}$, etc., which can act as decomposition catalysts for ferrate ($FeO_4^{2-}$).

It will be understood that not all phosphate salts or other potassium salts of inorganic acids are stable under the conditions of the washing step, and not all such salts are soluble in water in a sufficient concentration at the desirable temperatures for the washing step. For example, at a temperature of 20°–23° C., $KPO_3$ has a saturation solubility of about 1.6%, $K_2B_4O_7$ about 13%, and $KH_2PO_4$ about 25%. Further, these potassium salts in aqueous solution tend to decompose the potassium ferrate and are therefore undesirable for use in the process. Fortunately, however, there are a considerable number of potassium salts of inorganic acids which are suitable and highly soluble under the conditions of the process.

In preferred embodiments of the washing methods of the present invention, a potassium salt is employed at a concentration of above 40% by weight and which form a pH above 9.0. Optimum results are obtained when the potassium salt is used at a concentration in the range of 45 to 70% by weight and at a pH in the range from 10 to 12. Potassium salts providing these conditions include $K_3PO_4$, $K_2CO_3$, KF, $K_4P_2O_7$, and $K_2HPO_4$.

The washing should be carried out at a temperature at which the potassium ferrate is stable. For example, the washing may be performed at a temperature of from about 10° to 30°, such as a temperature of from 18° to 25°. It will be understood that the maximum or saturation solubility of the potassium salt will increase at higher temperatures. The potassium salt may be employed at or below saturation under the temperature conditions of the washing step. In general, the wash solution should be at least 50% saturation by the potassium salt, and in preferred embodiments, the potassium salt will be used at near saturation, viz. from about 90 to 100% of saturation. However, it is desirable to avoid undue crystallization of the potassium salt during the washing. Where the ferrate product is separated from the wash solution by centrifugation, the cooling of a product may result in crystallization if the wash solution is fully saturated at the temperature of contacting. The concentration may therefore be reduced somewhat to avoid crystallization of potassium salt. However, as indicated above, the ferrate product may contain potassium salt, and certain potassium salts tend to promote the stability of the ferrate product.

To remove substantially all of the KOH from the ferrate crystals, repeated washing with the aqueous potassium salt may be needed. For example, two to three washing steps may be desirable. In general, the washing should be continued until the ferrate contains less than 2 to 4% by weight of KOH (dry basis), and preferably less than 1 to 3% KOH. The amount of the potassium salt of the wash solution remaining in the final ferrate product may range from about 15 to 25% by weight (dry basis).

After the removal of the KOH by the washing step of this invention, the ferrate product may be subjected to temperature drying to remove the residual water. The drying should be at a temperature at which the ferrate is stable. For example, drying temperatures of from about 20° to 100° C., such as 50° to 60° C., can be used. Drying may be carried out over several hours in a moving air stream. Drying converts the residual KOH to $K_2Co_3$.

The method of this invention is further illustrated by the following specific example.

EXAMPLE I

The $K_2FeO_4$ is precipitated in a 40 to 50% aqueous KOH solution at room temperature, and is then separated by filtration or centrifugation. The cake can be washed with a little fresh 50% aqueous KOH and sucked or centifuged to dryness. The washing product of this invention is then applied. In a preferred embodiment, the filter cake (if filtration is used), is washed with a concentrated (room temperature) solution of $K_3PO_4$ (49.5%). When centrifugation is used, it is preferable that the $K_3PO_4$ solution should be 45% concentration. At higher concentrations, some of the tripotassium phosphate crystallizes on the surface of the centrifuge cake (due to the cooling effected caused by the spinning centrifuge). In either case, either $K_3PO_4$ solution is used to displace all of the originally adherent KOH. The excess phosphate solution is removed as far as possible by filtration suction or by centrifugation. After drying for several hours in a moving air stream at 50° to 60° C., the dried product will contain between 75 to 85% $K_2FeO_4$ and 15 to 25% $K_3PO_4$.x $H_2O$.

EXAMPLE II

The respective properties of potassium salts usable in the wash solution in accordance with the present invention was studied. The results are summarized below in Table A.

TABLE A

| Saturation Solubility of Potassium Salts in Water at 20° C.–23° C. | | pH | Specific Gravity Saturation | Solubility of $K_2FeO_4$ in Potassium Salt Solution | Stability of Solutions and $K_2FeO_4$ |
|---|---|---|---|---|---|
| 49% $K_3PO_4$ | 18.05% K | 11.0 | 1.578 | ~4 g/l | Stable |
| 53% $K_2CO_3$ | 29.99% K | 11.0 | 1.58 | ~8.5 g/l | Stable |
| 53% KF | 35.67% K | 11.5 | 1.52 | ~1.5 g/l | Stable |
| 62% $K_4P_2O_7$ | 29.35% K | 12.0 | 1.8 | ~7.5 g/l | Stable |
| 65% $K_2HPO_4$ | 24.2% K | 10.5 | 1.765 | ~0.2 g/l | Stable |

All of the potassium salts of Table A can therefore be advantageously employed in the washing method of this invention. When the potassium ferrate is recovered from the wash solution by filtration, the potassium salts may be used at the concentration shown in the left hand column of Table A. When the ferrate is to be recovered by centrifugation, the concentration can be reduced to avoid undue precipitation of the potassium salt, such as the reduction of about 5% by weight below the respective concentration shown in Table A.

It will be apparent to those skilled in the art that other potassium salts can be substituted for those described in this example and that comparable results can be obtained providing that the concentration, pH, and stability are in accordance with the method of the present invention. Although not essential, it is desirable that the potassium salts provide certain other properties. For example, since some salt will be present in the ferrate product, the potassium salt is preferably non-toxic. Further, for optimum commercial use of the invention, the potassium salt should be a reasonably priced commercially available product.

We claim:

1. The preparation of potassium ferrate (VI), $K_2FeO_4$, in which the $K_2FeO_4$ is crystallized from concentrated aqueous potassium hydroxide (KOH) solution, separated therefrom, and washed to remove residual KOH solution from the separated $K_2FeO_4$ crystals, wherein the improvement comprises washing the separated $K_2FeO_4$ crystals with an aqueous solution of a potassium salt of an inorganic acid to remove the residual KOH solution, said wash solution having a concentration of said potassium salt of at least 30% by weight, said potassium salt being stable in said wash solution in contact with said $K_2FeO_4$, and said potassium salt providing a pH in said wash solution of greater than 9.0.

2. The improvement of claim 1 in which said potassium salt is selected from the class consisting of $K_3PO_4$, $K_2CO_3$, KF, $K_4P_2O_7$, and $K_2HPO_4$.

3. The preparation of potassium ferrate (VI), $K_2FeO_4$, in which the $K_2FeO_4$ is crystallized from concentrated aqueous potassium hydroxide (KOH) solution, separated therefrom, and washed to remove residual KOH solution from the separated $K_2FeO_4$ crystals, wherein the improvement comprises washing the separated $K_2FeO_4$ crystals with an aqueous solution of a potassium salt of an inorganic acid to remove the residual KOH solution, said wash solution having a concentration of said potassium salt of at least 40% by weight, said potassium ferrate VI being stable in contact with said potassium salt in said wash solution, and said potassium salt providing a pH in said wash solution of greater than 9.0.

4. The improvement of claim 3 in which said potassium salt is $K_3PO_4$.

5. The improvement of claim 3 in which said potassium salt is $K_2CO_3$.

6. The improvement of claim 3 in which said potassium salt is KF.

7. The improvement of claim 3 in which said potassium salt is $K_4P_2O_7$.

8. The improvement of claim 3 in which said potassium salt is $K_2HPO_4$.

9. The preparation of potassium ferrate (VI), $K_2FeO_4$, in which the $K_2FeO_4$ is crystallized from concentrated aqueous potassium hydroxide (KOH) solution, separated therefrom, and washed to remove residual KOH solution from the separated $K_2FeO_4$ crystals, wherein the improvement comprises washing the separated $K_2FeO_4$ crystals with an aqueous solution of a potassium salt of an inorganic acid to remove the residual KOH solution, said wash solution having a concentration of said potassium salt of from 45 to 70% by weight, said $K_2FeO_4$ being stable in contact with said potassium salt in said wash solution, and said potassium salt providing a pH in said wash solution of from 10 to 12.

10. The improvement of claim 9 in which said potassium salt is selected from the class consisting of $K_3PO_4$, $K_2CO_3$, KF, $K_4P_2O_7$, and $K_2HPO_4$.

11. The method of claim 1, or claim 3, or claim 9 in which said potassium salt is a phosphate salt.

12. The method of claim 1, or claim 3, or claim 9 in which said potassium salt is a phosphate salt, and phosphate salt is present in said wash solution at 90 to 100% of saturation.

* * * * *